(12) United States Patent
Michishita

(10) Patent No.: US 11,920,204 B2
(45) Date of Patent: Mar. 5, 2024

(54) OXYGEN INJECTION FOR REFORMER FEED GAS FOR DIRECT REDUCTION PROCESS

(71) Applicant: Midrex Technologies, Inc., Charlotte, NC (US)

(72) Inventor: Haruyasu Michishita, Charlotte, NC (US)

(73) Assignee: Midrex Technologies, Inc., Charlotte, NC (US)

( * ) Notice: Subject to any disclaimer, the term of this patent is extended or adjusted under 35 U.S.C. 154(b) by 360 days.

(21) Appl. No.: 17/063,986

(22) Filed: Oct. 6, 2020

(65) Prior Publication Data

US 2022/0106651 A1    Apr. 7, 2022

(51) Int. Cl.
*C21B 11/02* (2006.01)
*F23N 5/00* (2006.01)
*F27B 1/08* (2006.01)

(52) U.S. Cl.
CPC .............. *C21B 11/02* (2013.01); *F23N 5/006* (2013.01); *F27B 1/08* (2013.01); *F23N 2221/06* (2020.01); *F23N 2229/00* (2020.01)

(58) Field of Classification Search
CPC ................ C21B 2100/22; F27D 2019/0043
See application file for complete search history.

(56) References Cited

U.S. PATENT DOCUMENTS

| | | | |
|---|---|---|---|
| 5,833,734 A | 11/1998 | Cip et al. | |
| 2002/0050097 A1* | 5/2002 | Fournier | F23C 6/047 |
| | | | 48/199 FM |
| 2003/0097908 A1 | 5/2003 | Hoffman et al. | |
| 2013/0312571 A1* | 11/2013 | Metius | C21B 13/02 |
| | | | 75/488 |
| 2019/0048429 A1 | 2/2019 | Vuletic et al. | |
| 2019/0300974 A1 | 10/2019 | Michishita et al. | |

FOREIGN PATENT DOCUMENTS

| | | | | |
|---|---|---|---|---|
| DE | 2810043 C2 * | 7/1987 | ........... | C04B 41/009 |
| WO | WO-2014091737 A1 * | 6/2014 | ............. | C21B 5/001 |

OTHER PUBLICATIONS

Dec. 10, 2021 International Search Report and Written Opinion issued in corresponding PCT Application No. PCT/US2021/050923.

* cited by examiner

*Primary Examiner* — Vanessa T. Luk
*Assistant Examiner* — Nikolas Takuya Pullen
(74) *Attorney, Agent, or Firm* — Clements Bernard Walker; Christopher L. Bernard; Christine Wilkes Beninati

(57) ABSTRACT

A direct reduction plant is disclosed. The direct reduction plant includes an oxygen injection system, a reformer, and a shaft furnace. The oxygen injection system includes an oxygen injection reactor and a main oxygen burner. The oxygen injection reactor is adapted to receive a gas mixture. The main oxygen burner is adapted to increase a temperature of the gas mixture by burning a mixture of fuel and oxygen fed to the main oxygen burner. The reformer is adapted to reform the gas mixture with the increased temperature. The shaft furnace is adapted to reduce iron ore using the reformed gas mixture.

12 Claims, 4 Drawing Sheets

OXYGEN INJECTION FOR REFORMER FEED GAS FOR DIRECT REDUCTION PROCESS

TECHNICAL FIELD

The present disclosure relates generally to a direct reduced process with a natural gas reformer. More specifically, the present disclosure relates to systems and methods for the enhancement of the reformer performance by increasing the temperature of the reformer feed gas using oxygen.

BACKGROUND

Direct Reduced Iron (DRI) is a premium ore-based metallic (OBM) raw material that is used to make a wide variety of steel products. As illustrated in FIG. 1, in a direct reduction process, such as the Midrex® process, iron oxide is reduced to direct reduced iron with a hot reducing gas, such as $H_2$ and CO, in a shaft furnace 11 of a direct reduction plant 10. Top gas 1, containing the reduction products, such as $H_2O$ and $CO_2$, as well as carried over reactants, such as $H_2$ and CO, is treated by a top gas scrubber 12 to remove dust and lower the temperature of the top gas 1, which can help control the $H_2O$ content of the top gas 1. Around one-third of the scrubbed gas is discharged and directed to the reformer 17 for use as fuel (top gas fuel) 3 for the reformer 17. The products of combustion are then sent out of the plant 10 through the flue gas stack 14. A remainder of the scrubbed gas 2 is directed to one or more compressors 13. The compressed gas 4 is mixed with the natural gas 5 before being directed to and recycled by the reformer 17.

Normally, the mixed gas 6 (mixed compressed gas 4 and natural gas 5) is preheated up to around 560° C. using a tubular heat exchanger 15 before being directed to the reformer 17, which reduces the heat duty of the reformer 17. Likewise, the combustion air supplied by an air blower 16 will be preheated using the tubular heat exchanger 15.

The preheated gas mixture exiting the tubular heat exchanger 15 is referred to as feed gas 7. In the reformer 17, $H_2O$ and $CO_2$ in the feed gas 7 will be reformed to $H_2$ and CO using $CH_4$, as the below reaction equations show, while $H_2$ and CO carried over in the top gas will be heated passing through the reformer 17. The hot reformed gas 8 is directed to the shaft furnace 11 where the hot reformed gas 8 is used to reduce the iron oxide. Due to the volumetric expansion of the gases that occur during the reforming reactions, the top gas fuel 3 is discharged from the recycle gas loop 9 at the outlet of the top gas scrubber 12

$$H_2O + CH_4 \rightarrow 3H_2 + CO \quad \text{(endothermic reaction)}$$

$$CO_2 + CH_4 \rightarrow 2H_2 + 2CO \quad \text{(endothermic reaction)}$$

The reformer 17, as a tubular type reformer, includes a catalyst packed bed inside reformer tubes through which the feed gas 7 passes while the outside of the reformer tubes is externally heated by burners. The reformed gas 8 exiting the reformer 17 is close to an equilibrium condition and the performance of the reformer 17 is mostly restricted by an amount of heat transferred to the feed gas 7 in the reformer tubes.

The performance of the reformer 17 can be significantly enhanced by elevating a reformer box temperature or increasing the burner output. However, the box temperature has reached a limit due to constraints of the materials used in the construction of the reformer tubes, especially when considering reasonable creep strength and the operation life of the reformer tubes. While performance of the reformer 17 can be enhanced by increasing the heat transfer area by either increasing the number of reformer tubes and/or by increasing the diameter of the reformer tubes, such enhancements to the reformer 17 require significant capital expenditures.

Another option to increase the amount of available heat for reforming reactions is to further increase the temperature of the feed gas 7. However, the current temperature of the feed gas 7 of 560° C. cannot be elevated much further using the tubular heat exchanger 15 due to the risk of coking within the tubular heat exchanger 15. In particular, cracking of the heavy hydrocarbon contained in the natural gas of the mixed gas 6 would cause carbon to deposit on the alloy surface of the tubes of the tubular heat exchanger 15 at elevated temperatures. The carbon deposition, or fouling, has a negative impact on the heat transfer efficiency of the tubular heat exchanger 15 which can lead to excessive temperatures in the tubes. Over prolonged periods of time, the result of the excessive temperatures can be tube failure and a reduction of operation life of the tubular heat exchanger 15. While heavy hydrocarbons can be removed from the natural gas with a pretreatment system, the pretreatment system requires a significant capital investment and will increase operating costs, such as by increasing the natural gas consumption of the direct reduction plant 10.

Even with removing heavy hydrocarbons from the mixed gas 6 prior to directing the mixed gas 6 to the tubular heat exchanger 15, the conventional alloy material for the tubes in the tubular heat exchanger 15 will only tolerate an increase of approximately 100° C. Due to this limit on the amount of increase in temperature of the feed gas 7 and the significant capital investment needed for a pretreatment system for removing heavy hydrocarbons from the natural gas of the mixed gas 6, it is difficult to justify the additional investment.

When the feed gas 7 enters the reformer tubes, contacts the catalyst, and gets heated by the burner, the feed gas 7 is exposed in the temperature range favorable for Boudouard carbon deposition on the catalyst in the lower part of the reformer tubes. This feed gas temperature range at the inlet of the tubes is 500-700° C. and is a kinetically favorable region for Boudouard carbon generation. This is a significant concern since Boudouard carbon quickly causes the catalyst to break down into fine pieces, which requires the catalyst to be replaced. To minimize the risk of Boudouard carbon deposition on the catalyst, an inert catalyst or a less reactive catalyst is loaded at the lower areas of the reformer tubes to quickly elevate the temperature of the feed gas 7 above the temperature range of the Boudouard reaction. However, loading an inert or less reactive catalyst reduces the reforming capacity of the reformer 17 as compared to the capacity of a reformer 17 fully loaded with a high activity catalyst. Thus, it is desirable to increase the feed gas temperature 7 above the temperature range of the Boudouard reaction, such as above 700° C., to mitigate the risk of Boudouard carbon deposition and the breakdown of the catalyst.

SUMMARY

The present disclosure generally provides a direct reduction plant with an oxygen injection system. In particular, the oxygen injection system combusts a mixture of oxygen and fuel to increase a temperature of a gas mixture prior to being fed to a reformer. The reformer reforms the gas mixture in preparation for using the reformed gas mixture in an iron ore direct reduction process.

Generally, the oxygen injection system receives the gas mixture from a heat exchanger that previously heated the gas mixture, such as by capturing heat from flue gas. By further increasing the temperature of the gas mixture using the oxygen injection system prior to feeding the gas mixture to the reformer, the capacity of the reformer is increased without expending the capital to increase the size of the reformer (such as by increasing the size and number of the reformer tubes). Increasing the capacity of the reformer results in an increased capacity of the direct reduction plant.

Further, the oxygen injection system can increase the temperature of the gas mixture above the Boudouard reaction temperature range, which reduces the possibility of Boudouard carbon deposits occurring on the catalyst in the lower part of the reformer tubes. As a result, a higher activity catalyst can be used in all areas of the reformer tubes since the risk of Boudouard carbon deposits breaking the catalyst down is reduced, further improving the efficiency of the reformer.

In one exemplary embodiment, the present disclosure provides a direct reduction plant. The direct reduction plant includes a reformer, an oxygen injection system, and a shaft furnace. The reformer is adapted to reform a gas mixture with an increased temperature. The oxygen injection system is adapted to increase a temperature of the gas mixture by burning the gas mixture with oxygen and adapted to discharge the gas mixture with the increased temperature to the reformer. The shaft furnace is adapted to reduce iron ore using the reformed gas mixture.

In one embodiment of the direct reduction plant, the oxygen injection system includes an oxygen injection reactor adapted to receive the gas mixture, and a main oxygen burner adapted to increase the temperature of the gas mixture by combusting a mixture of fuel and oxygen fed to the main oxygen burner. Optionally, the oxygen injection system is adapted to stoichiometrically combust the oxygen and the fuel to prevent unreacted oxygen from being carried over to the reformer.

In another embodiment of the direct reduction plant, the direct reduction plant further includes a nitrogen purge system adapted to purge oxygen remaining in the oxygen injection system during a shutdown process of the direct reduction plant.

In a further embodiment of the direct reduction plant, the oxygen injection system is adapted to increase a temperature of the gas mixture to at least 700° C. to mitigate a risk of Boudouard carbon deposition at the reformer.

In yet another embodiment of the direct reduction plant, the direct reduction plant further includes a flame detection system adapted to monitor a flame of the oxygen injection system.

In yet a further embodiment of the direct reduction plant, the direct reduction plant further includes an oxygen sensor adapted to monitor an oxygen concentration of the gas mixture after the temperature of the gas mixture is increased by the oxygen injection system.

In still another embodiment of the direct reduction plant, the direct reduction plant further includes a heat exchanger adapted to receive the gas mixture, heat the gas mixture, and discharge the gas mixture to the oxygen injection system.

In another exemplary embodiment, the present disclosure provides a method for a direct reduction process for direct reduced iron. The method includes feeding a gas mixture into an oxygen injection system. The method also includes increasing a temperature of the gas mixture in the oxygen injection system by burning a mixture of fuel and oxygen. The method further includes reforming the gas mixture with the increased temperature in a reformer. The method yet further includes reducing iron ore using the reformed gas mixture.

In one embodiment of the method, increasing the temperature of the gas mixture in the oxygen injection system by burning a mixture of fuel and oxygen includes receiving the gas mixture in an oxygen reactor including a main oxygen burner therein and combusting a mixture of fuel and oxygen fed to the main oxygen burner. Optionally, the method still further includes stoichiometrically combusting the oxygen and the fuel to prevent unreacted oxygen from being carried over to the reformer.

In another embodiment, the method still further includes purging oxygen remaining in the oxygen injection system with nitrogen during a shutdown process of the direct reduction plant.

In a further embodiment of the method, increasing the temperature of the gas mixture in the oxygen injection system includes increasing the gas mixture to at least 700° C. to mitigate a risk of Boudouard carbon deposition at the reformer.

In yet another embodiment, the method still further includes monitoring a flame of the oxygen injection system.

In yet a further embodiment, the method still further includes monitoring an oxygen concentration of the gas mixture after the temperature of the gas mixture is increased by the oxygen injection system.

In still another embodiment, the method still further includes heating the gas mixture in a heat exchanger prior to feeding the gas mixture to the oxygen injection system.

In a further exemplary embodiment, the present disclosure provides a direct reduction plant. The direct reduction plant incudes a heat exchanger, a reformer, and an oxygen injection system. The heat exchanger is adapted to pre-heat a gas mixture. The reformer is downstream of the heat exchanger. The reformer is adapted to reform the gas mixture in preparation for an iron ore reduction process. The oxygen injection system is positioned between the heat exchanger and the reformer. The oxygen injection system is adapted to receive the gas mixture pre-heated by the heat exchanger and increase a temperature of the gas mixture by burning the gas mixture with oxygen. The oxygen injection system is adapted to discharge the gas mixture with the increased temperature to the reformer.

In one embodiment of the direct reduction plant, the oxygen injection system includes an oxygen injection reactor adapted to receive the gas mixture, and a main oxygen burner adapted to increase the temperature of the gas mixture by combusting a mixture of fuel and oxygen fed to the main oxygen burner.

In another embodiment of the direct reduction plant, the oxygen injection system is adapted to increase a temperature of the gas mixture to at least 700° C. by stoichiometrically combusting oxygen and fuel.

In a further embodiment of the direct reduction plant, the direct reduction plant also includes a monitoring system. The monitoring system is adapted to monitor at least one of a flame of the oxygen injection system and an oxygen concentration of the gas mixture after the temperature of the gas mixture is increased by the oxygen injection system.

BRIEF DESCRIPTION OF THE DRAWINGS

The present disclosure is illustrated and described with reference to the various drawings, in which.

DESCRIPTION OF EXEMPLARY EMBODIMENTS

In various embodiments, the present disclosure relates to a direct reduction plant for direct reducing iron ore into direct reduced iron and a method for direct reducing iron. Again, the direct reduction plant includes an oxygen injection system that combusts a mixture of oxygen and fuel to increase a temperature of a gas mixture that is then fed to the reformer. The reformer reforms the gas mixture with the increased temperature that is then used in an iron ore direct reduction process.

Again, the oxygen injection system generally receives the gas mixture from a heat exchanger that previously heated the gas mixture. An increased temperature of the gas mixture due to the further heating improves the performance of the reformer. In particular, a heating load of the reformer is reduced, and the reforming capacity of the reformer is increased. Increasing the capacity of the reformer results in an increased capacity of the direct reduction plant. Further, this increase in capacity can be done instead of increasing a size of the reformer, such as by increasing the sizes of the reformer tube and increasing the number of reformer tubes in the reformer, which requires significant capital investment.

As noted above, the oxygen injection system can increase the temperature of the gas mixture above the Boudouard reaction temperature range fed to the reformer, which reduces the possibility of Boudouard carbon deposits occurring on the catalyst in the lower part of the reformer tubes. This allows for further increased capacity of the reformer as a high activity catalyst can be used in all areas of the reformer tubes. An inert or less reactive catalyst is no longer required to be loaded at the lower areas of the reformer tubes to quickly elevate the gas temperature in the reformer tubes.

The oxygen injection system further ensures that the mixed gas delivered to the reformer is not tainted with oxygen by stoichiometrically combusting the mixture of oxygen and fuel (i.e. by maintaining a stoichiometrically balanced fuel to oxygen ratio).

Figure 1:
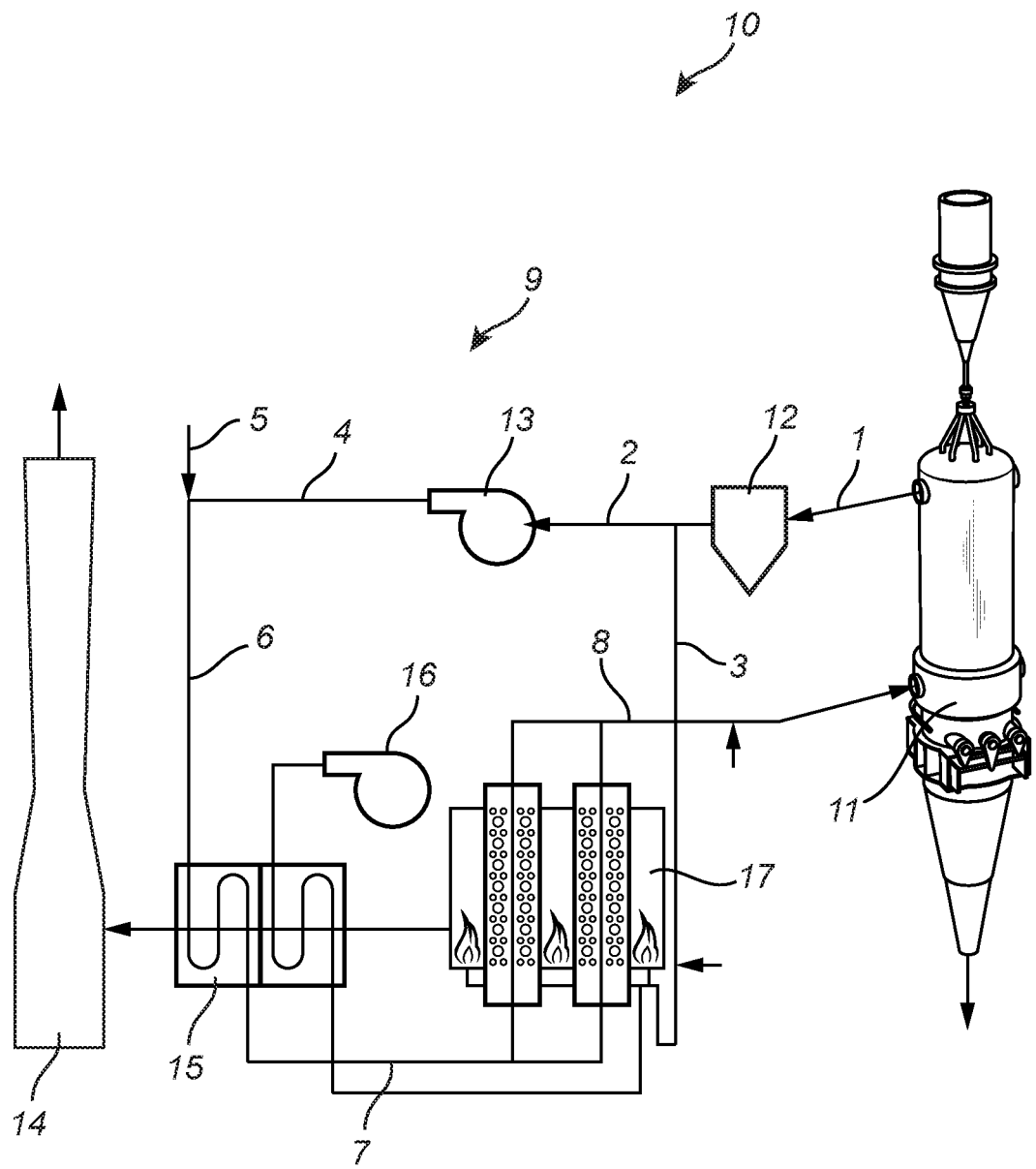
FIG. 1 is a schematic diagram of a direct reduction plant.
Figure 2:
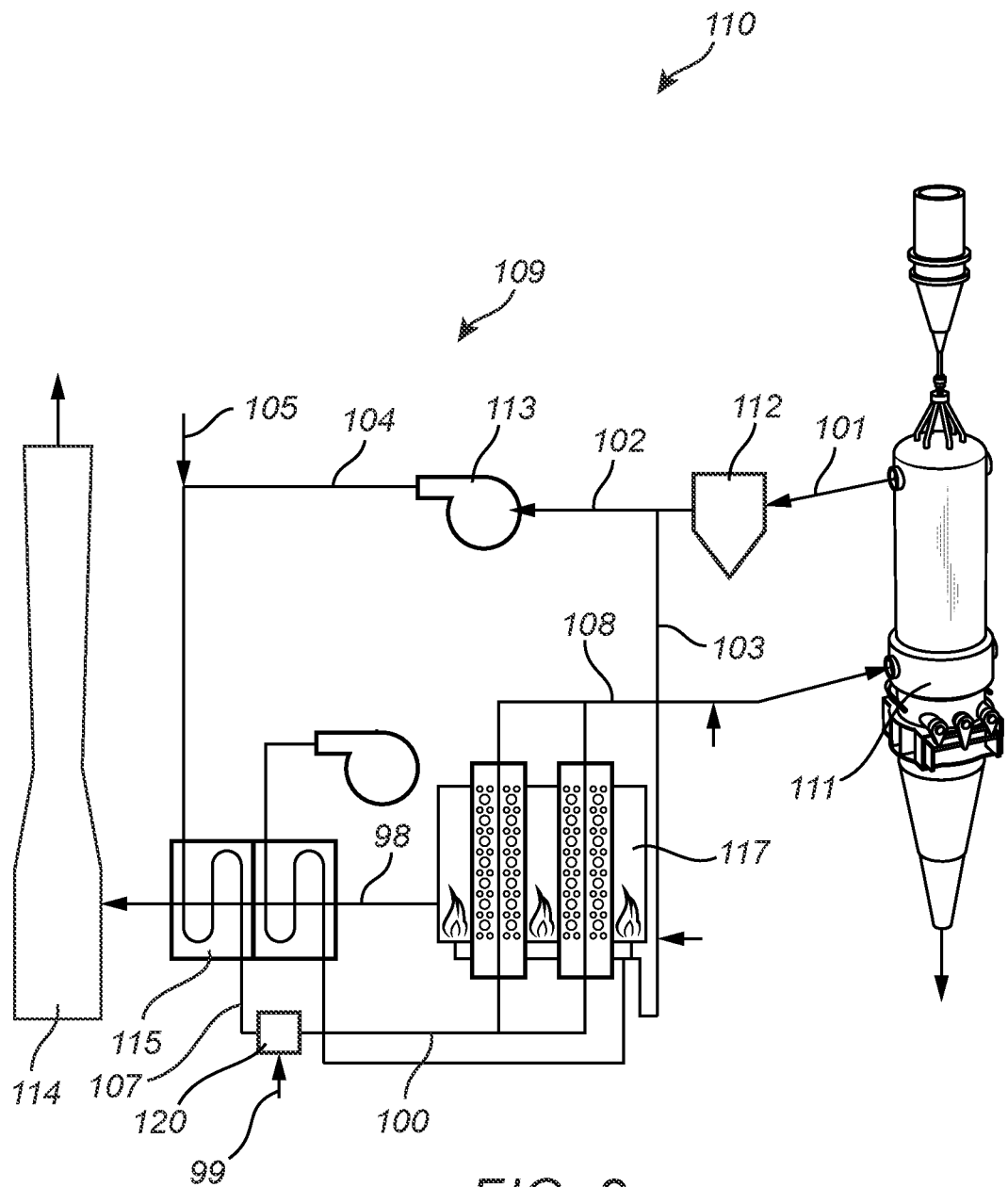
FIG. 2 is a schematic diagram of a direct reduction plant including an oxygen injection system.

FIG. 2 is a schematic diagram of a direct reduction plant 110 including an oxygen injection system 120. Referring to FIG. 2, the direct reduction plant 110 includes a shaft furnace 111, a gas scrubber 112, one or more gas compressors 113, a flue gas stack 114, a heat exchanger 115, the oxygen injection system 120, and a reformer 117. In the direct reduction plant 110, top gas 101 containing the reduction products is recycled from the shaft furnace 111 to the top gas scrubber 112. Top gas fuel 103 is sent to the reformer 117 burner system as a fuel source. The remaining scrubbed gas 102, with dust removed and the temperature thereof lowered, is directed to one or more compressors 113. The compressed gas 104 is mixed with natural gas 105 before being directed to the heat exchanger 115 that is arranged to capture heat from the flue gas 98 that is being directed from the reformer 117 to the flue gas stack 114. In embodiments, the heat exchanger 115 is a tubular heat exchanger.

The preheated gas mixture 107 is directed to the oxygen injection system 120 that further heats the preheated gas mixture 107 using oxygen. The feed gas 100 exists the oxygen injection system 120 at an elevated temperature that is fed to the reformer 117. The hot reformed gas 108 is directed to the shaft furnace 111 where the hot reformed gas 108 reduces iron oxide being fed, such as by gravity fed, through the shaft furnace containing the hot reformed gas 108.

The oxygen injection system 120 injects oxygen 99 into the preheated gas mixture 107 to elevate the temperature thereof, which results in the feed gas 100 having an elevated temperature as compared to the preheated gas mixture 107 exiting the heat exchanger 115. Preferably, the preheated gas mixture 107 exits the heat exchanger at a maximum of 560° C., and the oxygen injection system 120 elevates the temperature of the feed gas 100 further while injecting a minimal amount of oxygen 99.

In embodiments, the oxygen injection system 120 is adapted to inject oxygen 99 to increase the temperature of the feed gas 100 above the temperature range of the Boudouard reaction, and in particular, above 700° C. With the temperature of the feed gas 100 increased above the Boudouard reaction temperature range, the reformer 117 can be fully loaded with a high activity catalyst without having the concerns of the catalyst breaking down in the reformer 117 due to Boudouard carbon deposits.

The oxygen 99 injected into the preheated gas mixture 107, within the oxygen injection system 120 reacts with $H_2$, CO and $CH_4$ to generate combustion products, such as $H_2O$ and $CO_2$, in the resulting feed gas 100. These heated combustion products will be eventually adjusted by the outlet temperature of the top gas scrubber 112 or by the moisture content in the recycled scrubbed gas 102, and thus does not affect the gas quality.

Due to the increase in temperature of the feed gas 100, a capacity of the reformer 117 is increased, which allows for an increased flow rate of the iron oxide being fed through the shaft furnace 111. The increased flow rate of the iron oxide through the shaft furnace 111 results in an increase in capacity of the direct reduction plant for producing direct reduced iron. In embodiments, the flow rate of the recycled gas with the natural gas 105, the flow rate of the feed gas 100, and the flow rate of the reformed gas 108 are all increased. Accordingly, a 2.5 MTPY direct reduction plant 110 with the oxygen injection system 120, such as an Midrex 2.5 MTPY HDRI Plant, operates with a 13% increase in capacity for producing direct reduced iron when the temperature of the feed gas 100 is elevated by 200° C. with the oxygen injection system 120, while maintaining the heat duty of the reformer 117 relative to a direct reduction plant 10 without an oxygen injection system 120. Increasing the capacity of the reformer 117 without changing the size of the reformer 117 with the oxygen injection system 120 results in a capital cost reduction as compared to increasing the capacity of the reformer 117 by increasing the number of reformer tubes or the diameter of the reformer tubes in the reformer 117.

Figure 3:
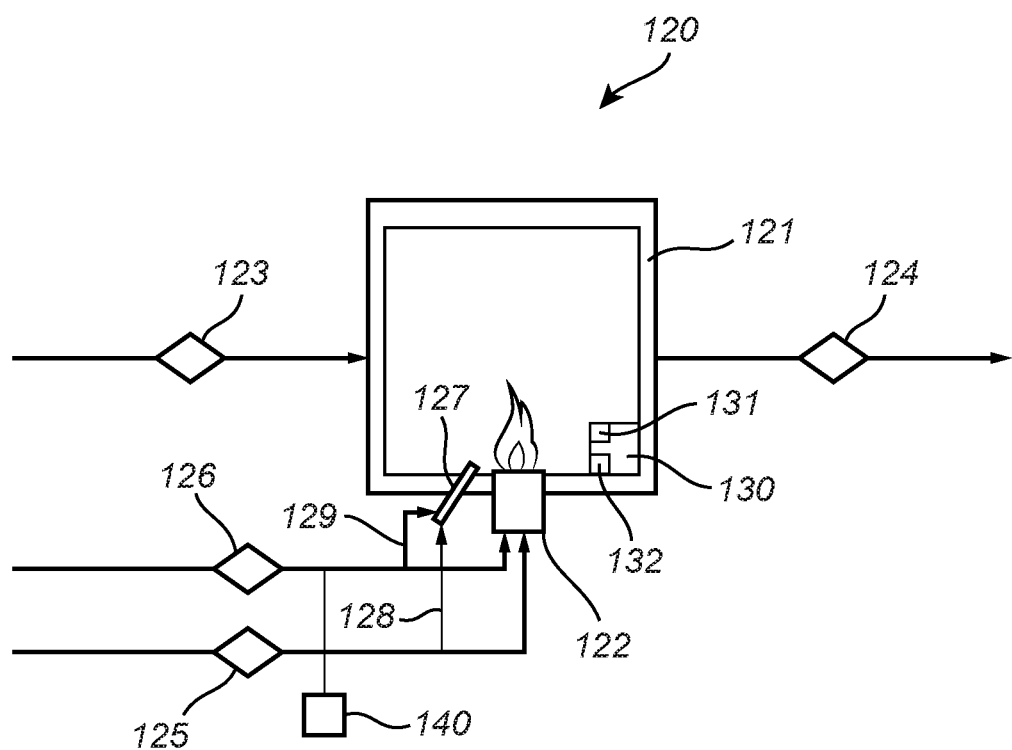
FIG. 3 is a schematic diagram of an exemplary embodiment of the oxygen injection system of FIG. 2.

FIG. 3 is a schematic diagram of an exemplary embodiment of the oxygen injection system 120 of FIG. 2. The oxygen injection system 120 includes an oxygen injection reactor 121, a main oxygen burner 122, a mixed gas inlet 123, and a feed gas outlet 124. The main oxygen burner 122 is independent and is adapted to heat the preheated mixed gas 107 fed into the oxygen injection reactor 121 by the mixed gas inlet 123. After being heated, the feed gas 100 is directed out of the oxygen injection reactor 121 via the feed gas outlet 124.

The oxygen injection system 120 also includes an oxygen feed 125 and a fuel feed 126. The oxygen feed 125 supplies the oxygen 99 to the main oxygen burner 122 and the fuel feed 126 supplies a fuel to the main oxygen burner 122. In some embodiments, the fuel is a mixture of natural gas and the top gas fuel 103 that is bled off of the recycle gas loop 109. In other embodiments, the fuel is natural gas. In embodiments, the main oxygen burner 122, the oxygen feed 125, and the fuel feed 126 are adapted to stoichiometrically maintain a fuel to oxygen ratio such that all of the oxygen 99 fed to the main oxygen burner 122 is combusted in the burner flame.

By stoichiometrically maintaining the fuel to oxygen ratio, the oxygen 99 is prevented from mixing into the feed gas 100, such that no unreacted oxygen is carried to the reformer 117. By ensuring that no unreacted oxygen is carried to the reformer 117, the temperature of the feed gas 100 will be prevented from rapidly increasing or fluctuating due to unreacted oxygen entering the reformer tubes and reacting with the catalyst of the reformer 117. Further, any negative influence of unreacted oxygen on the catalyst or on the reforming performance are also avoided.

In some embodiments, the oxygen injection system 120 includes a pilot burner 127, a pilot oxygen feed 128, and a pilot fuel feed 129. In the embodiment illustrated, some of the oxygen 99 from the oxygen feed 125 and fuel from the fuel feed 126 are diverted to the pilot burner 127 as shown by the pilot oxygen feed 128 and the pilot fuel feed 129. The temperature of the preheated gas mixture 107 upon exit of the heat exchanger 115 (around 560° C.) may not be high enough to ensure auto-ignition of the feed gas constituents, such as $H_2$, CO and $CH_4$ with the oxygen. To ensure the ignition of the fuel gas with the oxygen 99, the pilot burner 127 is adapted to remain running during idling conditions of the direct reduction plant 110. With the pilot burning remaining running during idling conditions of the direct reduction plant 110, the main oxygen burner 122 can be resumed quickly and safely in the feed gas atmosphere.

Further, to ensure the safe shutdown of the oxygen injection system 120, including the main oxygen burner 122 and the pilot burner 127, the oxygen injection system 120 is adapted to introduce nitrogen to purge any oxygen remaining in the oxygen feed 125 and the oxygen injection reactor 121.

In some embodiments, the oxygen injection system 120 also includes a monitoring system 130 to monitor any of the pilot burner 127, the main oxygen burner 122, oxygen levels within the oxygen injection reactor 121, such as at the entrance to the feed gas outlet 124, and the like. In embodiments, the monitoring system 130 is adapted to trigger an alarm when problems are detected with the pilot burner 127, the main oxygen burner 122, oxygen levels within the oxygen injection reactor 121, and the like.

In the embodiment illustrated, the monitoring system 130 includes an oxygen sensor 131 and a flame detection system 132. The oxygen sensor 131 is adapted to monitor an oxygen concentration of the gas mixture after the temperature of the gas mixture is increased by the oxygen injection system 120. This monitoring is performed at one of the oxygen injection reactor 121 and the feed gas outlet 124. The flame detection system 132 is adapted to monitor a flame of the oxygen injection system 120 including the flame of the main oxygen burner 122 and the pilot burner 127.

In embodiments, the direct reduction plant 110 includes a nitrogen injection system 140. The nitrogen injection system 140 can be a stand-alone system or incorporated into the oxygen injection system 120. The nitrogen injection system 140 is adapted to purge oxygen remaining in the oxygen injection system 120 during a shutdown process of the direct reduction plant 110.

Figure 4:
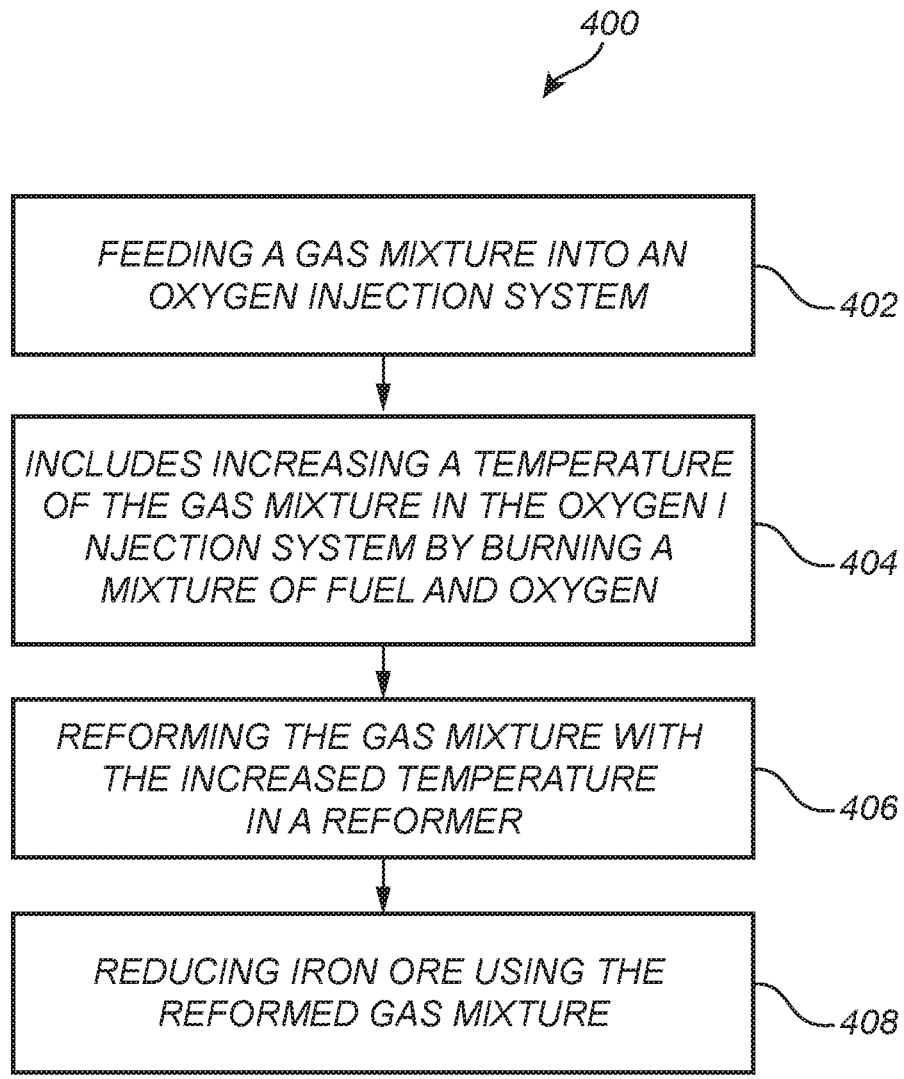
FIG. 4 is a flowchart of a method for a direct reduction process for direct reduced iron.

FIG. 4 is a flowchart of a method 400 for a direct reduction process for direct reduced iron. The method 400 includes feeding a gas mixture into an oxygen injection system 120 at step 402. In embodiments, the gas mixture includes at least one of natural gas and top gas 101. In embodiments, the top gas 101 is scrubbed prior to mixing with the natural gas. In some embodiments, the gas mixture is preheated in a heat exchanger 115. In some embodiments, the temperature of the gas mixture fed into the oxygen injection system 120 is below 560° C.

The method also includes increasing a temperature of the gas mixture in the oxygen injection system 120 by burning a mixture of fuel and oxygen at step 404. In embodiments, the ratio of the fuel and oxygen is such that all of the oxygen fed to the main oxygen burner 122 is combusted in the burner flame. In some embodiments, increasing the temperature of the gas mixture in the oxygen injection system 120 by burning the mixture of fuel and oxygen includes receiving the gas mixture in an oxygen reactor 121 including a main oxygen burner 122 therein and combusting a mixture of fuel and oxygen fed to the main oxygen burner 122. In some embodiments, the temperature is increased to a temperature above the temperature range of the Boudouard reaction. In some embodiments, the temperature is increased to a temperature above 700° C. In embodiments, the temperature is increased by at least 200° C.

The method further includes reforming the gas mixture with the increased temperature in a reformer at step 406. The method yet further includes reducing iron ore using the reformed gas mixture at step 408.

In some embodiments, the method further includes stoichiometrically combusting the oxygen and the fuel to prevent unreacted oxygen from being carried over to the reformer. In some embodiments, the method further includes In embodiments, at least some of the fuel burned with the oxygen is bled off of a recycle gas loop that draws top gas from the shaft furnace 111. In some embodiments, the method further includes maintaining a pilot flame in the oxygen injection system 120 during an idle process of the direct reduction plant 110. In some embodiments, the method further includes purging oxygen remaining in the oxygen injection system 120 with nitrogen during a shutdown process of the direct reduction plant 110.

In embodiments, the method further comprises monitoring the oxygen injection system 120. The monitoring includes at least one of monitoring a flame of the oxygen injection system 120 and monitoring an oxygen concentration of the gas mixture after the temperature of the gas mixture is increased by the oxygen injection system.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A direct reduction plant, comprising:
a catalytic reformer;
a heat exchanger adapted to receive a gas mixture comprising natural gas and compressed shaft furnace top gas, pre-heat the gas mixture to form a pre-heated gas mixture at about 560° C., and discharge the pre-heated gas mixture to an oxygen injection system, wherein the oxygen injection system is positioned between the heat exchanger and the catalytic reformer, and the catalytic reformer is positioned downstream of the heat exchanger;
the oxygen injection system adapted to further increase temperature of the pre-heated gas mixture to about 700° C. or above, to mitigate a risk of Boudouard carbon deposition at the catalytic reformer, by burning a fuel with oxygen and adapted to discharge the pre-heated gas mixture with the increased temperature directly to the catalytic reformer; wherein the catalytic reformer is adapted to reform the pre-heated gas mixture with the increased temperature and produce a reformed gas mixture and adapted to provide the reformed gas mixture directly to a shaft furnace; and
the shaft furnace adapted to reduce iron ore using the reformed gas mixture.

2. The direct reduction plant of claim 1, wherein the oxygen injection system includes an oxygen injection reactor adapted to receive the pre-heated gas mixture, and a main oxygen burner adapted to increase the temperature of the pre-heated gas mixture by combusting a mixture of fuel and oxygen fed to the main oxygen burner.

3. The direct reduction plant of claim 2, wherein the oxygen injection system is adapted to stoichiometrically combust the oxygen and the fuel to prevent unreacted oxygen from being carried over to the reformer.

4. The direct reduction plant of claim 1, further comprising
a nitrogen purge system adapted to purge oxygen remaining in the oxygen injection system during a shutdown process of the direct reduction plant.

5. The direct reduction plant of claim 1, further comprising:
a flame detection system adapted to monitor a flame of the oxygen injection system.

6. The direct reduction plant of claim 1, further comprising:
an oxygen sensor adapted to monitor an oxygen concentration of the pre-heated gas mixture after the temperature of the pre-heated gas mixture is increased by the oxygen injection system.

7. A method for a direct reduction process for direct reduced iron, comprising:
feeding a gas mixture into an oxygen injection system;
heating a gas mixture comprising natural gas and compressed shaft furnace top gas in a heat exchanger to form a pre-heated gas mixture at about 560°C. prior to feeding the pre-heated gas mixture to an oxygen injection system, wherein the oxygen injection system is positioned between the heat exchanger and a catalytic reformer, and the catalytic reformer is positioned downstream of the heat exchanger;
further increasing a temperature of the pre-heated gas mixture in the oxygen injection system to about 700° C. or above, to mitigate a risk of Boudouard carbon deposition at the catalytic reformer, by burning a fuel and oxygen;
discharging the pre-heated gas mixture with the increased temperature from the oxygen injection system directly to the catalytic reformer;
reforming the pre-heated gas mixture with the increased temperature in the catalytic reformer to produce a reformed gas mixture;
providing the reformed gas mixture directly to a shaft furnace; and reducing iron ore in the shaft furnace using the reformed gas mixture.

8. The method of claim 7, wherein increasing the temperature of the pre-heated gas mixture in the oxygen injection system by burning a mixture of fuel and oxygen includes receiving the pre-heated gas mixture in an oxygen reactor including a main oxygen burner therein and combusting a mixture of fuel and oxygen fed to the main oxygen burner.

9. The method of claim 8, further comprising:
stoichiometrically combusting the oxygen and the fuel to prevent unreacted oxygen from being carried over to the reformer.

10. The method of claim 7, further comprising:
purging oxygen remaining in the oxygen injection system with nitrogen during a shutdown process of the direct reduction plant.

11. The method of claim 7, further comprising:
monitoring a flame of the oxygen injection system.

12. The method of claim 7, further comprising:
monitoring an oxygen concentration of the pre-heated gas mixture after the temperature of the pre-heated gas mixture is increased by the oxygen injection system.

* * * * *